(12) United States Patent
Hiiro et al.

(10) Patent No.: US 6,218,475 B1
(45) Date of Patent: Apr. 17, 2001

(54) ALKENYL CONTAINING ISOBUTYLENE BLOCK COPOLYMER AND PROCESS FOR PRODUCING IT

(75) Inventors: Tomoki Hiiro, Akashi; Shinji Ozawa, Kyoto; Taizo Aoyama, Takasago, all of (JP)

(73) Assignee: Kaneka Corporation, Osaka (JP)

( * ) Notice: Subject to any disclaimer, the term of this patent is extended or adjusted under 35 U.S.C. 154(b) by 0 days.

(21) Appl. No.: 09/205,608

(22) Filed: Dec. 4, 1998

(30) Foreign Application Priority Data

Dec. 4, 1997 (JP) .................................................... 9-333780
Nov. 9, 1998 (JP) .................................................. 10-317711

(51) Int. Cl.⁷ ........................ C08F 293/00; C08F 210/10
(52) U.S. Cl. ........................ 525/314; 525/319; 526/348.7
(58) Field of Search ................................... 525/314, 319, 525/918; 526/348.7

(56) References Cited

U.S. PATENT DOCUMENTS

| 5,428,111 | * | 6/1995 | Faust et al. ........................ 525/314 |
| 5,777,037 | * | 7/1998 | Yamanaka et al. ................. 525/288 |

FOREIGN PATENT DOCUMENTS

| 0 264 214 A2 | 4/1988 | (EP) . |
| 0 504 800 A2 | 3/1992 | (EP) . |
| 0 592 957 A1 | 4/1994 | (EP) . |
| 0 761 752 A1 | 3/1997 | (EP) . |
| 0 856 540 A1 | 8/1998 | (EP) . |
| 0 866 096 A1 | 9/1998 | (EP) . |
| WO 95/10554 | 4/1995 | (WO) . |

* cited by examiner

Primary Examiner—James J. Seidleck
Assistant Examiner—Olga Asinovsky
(74) Attorney, Agent, or Firm—Connolly Bove Lodge & Hutz

(57) ABSTRACT

The present invention has its object to provide an isobutylene group block copolymer containing a highly reactive alkenyl group with a high rate of introduction of an alkenyl, and process for producing the same.

An alkenyl-group-containing isobutylene group block copolymer comprising a polymer block derived from (a) a monomer component containing isobutylene group as a predominant monomer and (b) a monomer component not containing isobutylene group as a predominant monomer, in which said block copolymer has an alkenyl group of the following general formula (1).

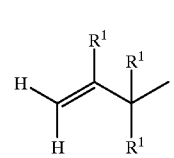

(1)

7 Claims, No Drawings

ALKENYL CONTAINING ISOBUTYLENE BLOCK COPOLYMER AND PROCESS FOR PRODUCING IT

TECHNICAL FIELD

The present invention relates to an alkenyl-group-containing isobutylene group block copolymer and a reactive-silicon-group-containing isobutylene group block copolymer. More particularly, the invention relates to a novel process for producing an alkenyl-group-containing isobutylene group block copolymer and a reactive-silicon-group-containing isobutylene group block copolymer.

PRIOR ART

The isobutylene group block copolymer, though not crosslinked, is comparable to closslinked rubber in strength and elasticity, having high impact resistance and flexibility, and as easy to mold as a thermoplastic resin. Therefore, attempts have been made to exploit it as an elastomer material or an impact resistance improving agent for a thermoplastic resin.

Japanese Kokoku koho Hei-7-100763, for instance, discloses a composition comprising an isobutylene group block copolymer and a thermoplastic resin. In a composition of this type, however, the compatibility of the thermoplastic resin with the isobutylene group block copolymer is not sufficiently high depending on the type of the resin, and therefore, the composition cannot exhibit sufficiently useful physical properties such as impact resistance and mechanical strength.

As a process for avoiding the above disadvantage, there is known a process which comprises introducing a functional group into an isobutylene group block copolymer. Japanese Kokai Publication Hei-6-271751, for instance, discloses a composition comprising a hydroxy-terminated isobutylene group block copolymer and a polyester resin. Japanese Kokai Publication Hei-6-271751 further discloses, as an intermediate of said hydroxy-terminated isobutylene group block copolymer, an alkenyl-terminated isobutylene group block copolymer available upon dehydrochlorination of a chlorine-terminated block copolymer synthesized in the system comprising 1,4-di-(2-methoxy-2-propyl)benzene and titanium tetrachloride as an initiator.

However, because those technologies have the disadvantage that they need stringent reaction conditions and that enhancing the reaction rate is difficult, the rate of introduction of the alkenyl group is not sufficiently high. Furthermore, because the alkenyl group that can be introduced is limited to groups of the isopropenyl type, the alkenyl function introduced is not sufficiently reactive and cannot be easily converted to other functional groups.

SUMMARY OF THE INVENTION

The present invention has for its object to provide an isobutylene group block copolymer which can be easily synthesized with a high alkenyl introduction rate and insuring a high reactivity of the alkenyl group so introduced and a reactive-silicon-group-containing isobutylene group block copolymer, and an expedient process for producing these copolymers.

The present invention, therefore, relates to an alkenyl-group-containing isobutylene group block copolymer comprising a polymer block derived from (a) a monomer component containing isobutylene group as a predominant monomer and a polymer block derived from (b) a monomer component not containing isobutylene group as a predominant monomer, said copolymer containing an alkenyl group of general formula (1);

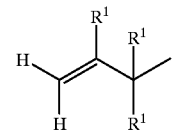

(1)

wherein a plurality of $R^1$ may be the same or different and each represents hydrogen, halogen, or a substituted or unsubstituted monovalent organic group.

The present invention relates to a process for producing an alkenyl-group-containing isobutylene group block copolymer which comprises adding an alkenyl-group-containing silicon compound in the course of the polymerization of (a) a monomer component containing isobutylene group as a predominant monomer with (b) a monomer component not containing isobutylene group as a predominant monomer in the presence of a polymerization initiator of the following general formula (2);

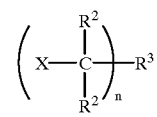

(2)

wherein a plurality of $R^2$ may be the same or different and each represents hydrogen or a monovalent hydrocarbon group containing 1 to 6 carbon atoms; $R^3$ represents a mono- or poly-valent aromatic hydrocarbon group or a mono- or poly-valent aliphatic hydrocarbon group; X represents halogen or an alkoxy or acyloxy group containing 1 to 6 carbon atoms; and n represents an integer of 1 to 6, with providing that n is equal to two or more, the plurality of X may be the same or different.

Further, the present invention relates to a reactive-silicon-group-containing isobutylene group block copolymer comprising a polymer block derived from (a) a monomer component containing isobutylene group as a predominant monomer and a polymer block derived from (b) a monomer component not containing isobutylene group as a predominant monomer, said copolymer containing a reactive silicon group of general formula (4);

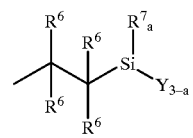

(4)

wherein a plurality of $R^6$ may be the same or different and each represents hydrogen, halogen, or a substituted or unsubstituted monovalent organic group; $R^7$ represents a monovalent organic group of 1 to 5 carbon atoms, and when two of $R^7$ are contained, these may be the same or different; Y represents a halogen atom or alkoxy group, and providing that more than two of Y are contained, these may be the same or different; and a represents an integer of 0 to 2.

Furthermore, the present invention relates to a process for producing a reactive-silicon-group-containing isobutylene group block copolymer which comprises subjecting the compound represented by the following general formula (5) to hydrosilylation reaction with an alkenyl group of an alkenyl-group-containing isobutylene group block copolymer comprising a polymer block derived from (a) a monomer component containing isobutylene group as a predominant monomer and a polymer block derived from (b) a monomer component not containing isobutylene group as a predominant monomer.

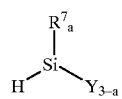

(5)

wherein $R^7$ represents a monovalent organic group of 1 to 5 carbon atoms, and when two of $R^7$ are contained, these may be the same or different; Y represents a halogen atom or alkoxy group, with providing that more than two of Y are contained, these may be the same or different; and a represents an integer of 0 to 2.

DETAILED DESCRIPTION OF THE INVENTION

The present invention is directed to an alkenyl-group-containing isobutylene group block copolymer comprising a polymer block derived from (a) a monomer component containing isobutylene group as a predominant monomer and a polymer block derived from (b) a monomer component not containing isobutylene group as a predominant monomer, said alkenyl-group-containing isobutylene group block copolymer containing an alkenyl group of general formula (1).

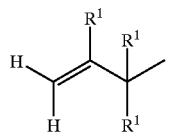

(1)

The alkenyl group of the above general formula (1) may be located either in the polymer block derived from (a) a monomer component containing isobutylene group as a predominant monomer or in the polymer block derived from (b) a monomer component not containing isobutylene group as a predominant monomer, although it is preferably located in the polymer block derived from (b) a monomer component not containing isobutylene group as a predominant monomer.

The polymer block derived from (a) a monomer component containing isobutylene group as a predominant monomer may or may not contain any monomer component other than isobutylene group as a comonomer component unit. The monomer other than isobutylene group which can be used is not particularly restricted provided that it is a monomer capable of cationic polymerization, but includes aliphatic olefins, aromatic vinyl compounds, dienes, vinyl ethers, silanes, vinylcarbazole, β-pinene, and acenaphthylene, among other monomers. Those monomers may be used each alone or in combination.

The aliphatic olefinic monomers which can be used are not particularly restricted but include propylene, 1-butene, 2-methyl-1-butene, 3-methyl-1-butene, pentene, hexene, cyclohexene, 4-methyl-1-pentene, vinylcyclohexene, octene, and norbornene, among others. Those monomer components can be used each alone or in combination.

The aromatic vinyl monomers which can be used are not particularly restricted but include styrene, o-, m-, or p-methylstyrene, α-methylstyrene, β-methylstyrene, 2,6-dimethylstyrene, 2,4-dimethylstyrene, α-methyl-o-methylstyrene, α-methyl-m-methylstyrene, α-methyl-p-methylstyrene, β-methyl-o-methylstyrene, β-methyl-m-methylstyrene, β-methyl-p-methylstyrene, 2,4,6-trimethylstyrene, α-methyl-2,6-dimethylstyrene, α-methyl-2,4-dimethylstyrene, β-methyl-2,6-dimethylstyrene, β-methyl-2,4-dimethylstyrene, o-, m-, or p-chlorostyrene, 2,6-dichlorostyrene, 2,4-dichlorostyrene, α-chloro-o-chlorostyrene, α-chloro-m-chlorostyrene, α-chloro-p-chlorostyrene, β-chloro-o-chlorostyrene, β-chloro-m-chlorostyrene, β-chloro-p-chlorostyrene, 2,4,6-trichlorostyrene, α-chloro-2,6-dichlorostyrene, α-chloro-2,4-dichlorostyrene, β-chloro-2,6-dichlorostyene, β-chloro-2,4-dichlorostyrene, o-, m-, or p-t-butylstyrene, o-, m-, or p-methoxystyrene, o-, m-, or p-chloromethylstyrene, o-, m-, or p-bromomethylstyrene, silyl-substituted styrene derivatives, vinylnaphthalene derivatives, and indene derivatives, among others. Those monomers can be used each alone or in combination.

The diene monomers which can be used are not particularly restricted, either, but include butadiene, isoprene, cyclopentadiene, cyclohexadiene, dicyclopentadiene, divinylbenzene, and ethylidenenorbornene, among others. Those dienes can be used each independently or in combination.

The vinyl ether monomers which can be used are not particularly restricted but include methyl vinyl ether, ethyl vinyl ether, (n- or iso)propyl vinyl ether, (n-, sec-, tert-, or iso)butyl vinyl ether, methyl propenyl ether, and ethyl propenyl ether, among others. Those vinyl ethers can be used each independently or in combination.

The silane compounds which can be used are not particularly restricted but include vinyltrichlorosilane, vinylmethyldichlorosilane, vinyldimethylchlorosilane, vinyldimethylmethoxysilane, vinyltrimethylsilane, divinyldichlorosilane, divinyldimethoxysilane, divinyldimethylsilane, 1,3-divinyl-1,1,3,3-tetramethyldisiloxane, trivinylmethylsilane, γ-methacryloyloxypropyltrimethoxysilane, and γ-methacryloyloxypropylmethyldimethoxysilane, among others. Those silane compounds can be used each independently or in combination.

The polymer block derived from (a) a monomer component containing isobutylene group as a predominant monomer is a polymer block containing 60 weight % or more, preferably 80 weight % or more, of isobutylene group as a monomer unit.

The polymer block derived from (b) a monomer component not containing isobutylene group as a predominant monomer is a polymer block having an isobutylene group content of not more than 30 weight %, preferably not more than 10 weight %, and more preferably not more than 3 weight % and containing a monomer other than isobutylene group. The monomer component other than isobutylene group which can be used is not particularly restricted provided that it is a monomer capable of cationic polymerization and the species mentioned hereinbefore can be used.

The polymer block derived from (b) a monomer component not containing isobutylene group as a predominant monomer is preferably a block comprising an aromatic vinyl monomer, among said monomer species other than isobutylene group, as a major constituent monomer unit. In this case, the aromatic vinyl monomer content of said monomer component is not less than 60 weight %, preferably not less than 80 weight %. The preferred aromatic vinyl monomer is styrene, α-methylstyrene, p-methylstyrene, or indene. Those monomer components can be used each independently or in combination.

The structure of said isobutylene group block copolymer is not particularly restricted but includes a diblock copolymer consisting of a polymer block derived from (b) a monomer component not containing isobutylene group as a predominant monomer—a polymer block derived from (a) a monomer component containing isobutylene group as a predominant monomer, a triblock copolymer consisting of a polymer block derived from (b) a monomer component not containing isobutylene group as a predominant monomer—a polymer block derived from (a) a monomer component containing isobutylene group as a predominant monomer—a polymer block derived from (b) a monomer component not containing isobutylene group as a predominant monomer, a triblock copolymer consisting of a polymer block derived from (a) a monomer component containing isobutylene group as a predominant monomer—a polymer block derived from (b) a monomer component not containing isobutylene group as a predominant monomer—a polymer block derived from (a) a monomer component containing isobutylene group as a predominant monomer and a star block copolymer comprising three or more arms each consisting of a polymer block derived from (a) a monomer component containing isobutylene group as a predominant monomer and a polymer block derived from (b) a monomer component not containing isobutylene group as a predominant monomer as attached to a polyfunctional compound core. Among such block structures, a triblock copolymer structure consisting of a polymer block derived from (b) a monomer component not containing isobutylene group as a predominant monomer—a polymer block derived from (a) a monomer component containing isobutylene group as a predominant monomer—a polymer block derived from (b) a monomer component not containing isobutylene group as a predominant monomer is preferred from the standpoint of the balance of physical properties. The more preferred is a triblock copolymer consisting of a polymer block derived from a monomer component containing as a predominant monomer an aromatic vinyl monomer component—a polymer block derived from (a) a monomer component containing isobutylene group as a predominant monomer—a polymer block derived from a monomer component containing as a predominant monomer an aromatic vinyl monomer.

The ratio of said polymer block derived from (a) a monomer component containing isobutylene group as a predominant monomer to said polymer block derived from (b) a monomer component not containing isobutylene group as a predominant monomer which can be used is not particularly restricted but can be selected according to the desired copolymer characteristics. It is preferable that the ratio of said polymer block derived from (a) a monomer component containing isobutylene group as a predominant monomer to said polymer block derived from (b) a monomer component not containing isobutylene group as a predominant monomer is selected in such a manner that isobutylene group accounts for 95 to 20 weight % and said aromatic vinyl monomer accounts for 5 to 80 weight %, respectively, of the product isobutylene group block copolymer. More preferably, isobutylene group accounts for 85 to 60 weight % and said aromatic vinyl monomer component accounts for 15 to 40 weight %. When isobutylene group alone is used for (a) a monomer component containing isobutylene group as a predominant monomer and said aromatic vinyl monomer component alone is used for (b) a monomer component not containing isobutylene group as a predominant monomer, the proportion of said polymer block derived from (a) a monomer component containing isobutylene group as a predominant monomer can be selected from within the range of 95 to 20 weight % and the proportion of said polymer block derived from (b) a monomer component not containing isobutylene group as a predominant monomer can be selected within the complementary range of 5 to 80 weight %. When the proportion of said aromatic vinyl monomer exceeds 80 weight %, the isobutylene group block copolymer becomes too hard. When the proportion of said aromatic vinyl polymer is smaller than 5 weight %, the product isobutylene group block copolymer becomes too soft, with the result that it cannot sufficiently exhibit the performance characteristics required of an elastomer material.

In the alkenyl-group-containing isobutylene group block copolymer of the present invention, it is preferred that said polymer block derived from (b) a monomer component not containing isobutylene group as a predominant monomer contains the alkenyl group of the following general formula (1);

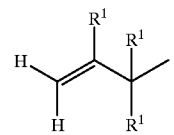

(1)

wherein the plurality of $R^1$ in the alkenyl group of general formula (1) may be the same or different and each represents hydrogen, halogen, or a substituted or unsubstituted monovalent organic group. The halogen mentioned above is not particularly restricted but may for example be chlorine, fluorine, bromine, or iodine. The substituted or unsubstituted monovalent organic group which can be used is not particularly restricted, either, but may for example be a monovalent hydrocarbon group, an alkoxy group, a phenoxy group, a carboxyl group, or an ester residue.

The hydrocarbon group mentioned above includes straight-chain or branched alkyl and alkenyl groups each containing 1 to 20 carbon atoms, preferably 1 to 10 carbon atoms, and more preferably 1 to 6 carbon atoms, alkoxy group, cycloalkyl group and phenyl group, and alkylaryl group containing 7 to 20 carbon atoms, preferably 7 to 14 carbon atoms, and more preferably 7 to 10 carbon atoms. Unless the advantageous features of the present invention are compromised, at least some of the hydrogen atoms in the hydrocarbon group may be substituted by suitable substituent groups.

The preferred species of said alkenyl group is allyl. The alkenyl-group-containing isobutylene group block copolymer may have said alkenyl group in any desired position of the molecular chain, but from the reactivity standpoint, the alkenyl group is preferably located in at least one terminal position of the molecular chain.

The second aspect of the present invention is concerned with a process for producing an alkenyl-group-containing isobutylene group block copolymer which comprises adding an alkenyl-group-containing silicon compound in the course of the polymerization of (a) a monomer component containing isobutylene group as a predominant monomer and (b) a monomer component not containing isobutylene group as a predominant monomer in the presence of a polymerization initiator of the following general formula (2).

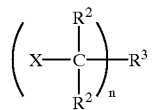
(2)

The polymerization initiator of general formula (2) is considered to provide the site for initiation of cationic polymerization. The above plurality of $R^2$ may be the same or different and each represents hydrogen or a monovalent hydrocarbon group containing 1 to 6 carbon atoms. The monovalent hydrocarbon group of 1 to 6 carbon atoms is not particularly restricted but may for example be methyl, ethyl, n-propyl, or isopropyl. $R^3$ represents a mono- or poly-valent aromatic hydrocarbon group or a mono- or poly-valent aliphatic hydrocarbon group. In the above formula, X represents halogen or an alkoxy or acyloxy group of 1 to 6 carbon atoms. The halogen mentioned above is not particularly restricted but may for example be chlorine, fluorine, bromine, or iodine. The alkoxy group of 1 to 6 carbon atoms is not particularly restricted but may for example be methoxy, ethoxy, n-propoxy or isopropoxy group. The acyloxy group of 1 to 6 carbon atoms is not particularly restricted but may for example be acetyloxy or propionyloxy. The symbol n represents an integer of 1 to 6. When n represents two or more, the plurality of X may be the same or different.

The above polymerization initiator which can be used specifically includes but is not limited to 1-chloro-1-methylethylbenzene[$C_6H_5C(CH_3)_2Cl$], 1,4-bis(1-chloro-1-methylethyl)benzene[1,4-$Cl(CH_3)_2CC_6H_4C(CH_3)_2Cl$], 1,3-bis(1-chloro-1-methylethyl)benzene[1,3-$Cl(CH_3)_2CC_6H_4C(CH_3)_2Cl$], 1,3,5-tris(1-chloro-1-methylethyl)benzene[1,3,5-$(ClC(CH_3)_2)_3C_6H_3$], and 1,3-bis(1-chloro-1-methylethyl)-5-(tert-butyl)benzene[1,3-$(C(CH_3)_2Cl)_2$-5-$(C(CH_3)_3)C_6H_3$]. Here, bis(1-chloro-1-methylethyl)benzene is also known as bis(α-chloroisopropyl)benzene, bis(2-chloro-2-propyl) benzene, or dicumyl chloride. Among those initiators, 1,4-bis(1-chloro-1-methylethyl)benzene is particularly preferred from the standpoint of reactivity and availability.

The above-mentioned (a) monomer component containing isobutylene group as a predominant monomer may or may not contain monomer component species other than isobutylene group. Such monomer species other than isobutylene group are not particularly restricted provided that they are capable of cationic polymerization and, as such, the specific monomers mentioned hereinbefore can be employed.

The above-mentioned (a) monomer component containing isobutylene group as a predominant monomer is a monomer component containing at least 60 weight %, preferably at least 80 weight %, of isobutylene group.

The (b) monomer component not containing isobutylene group as a predominant monomer is a monomer component containing 30 weight % or less, preferably 10 weight % or less, more preferably 3 weight % or less, of isobutylene group. The monomer other than isobutylene group which can be used is not particularly restricted provided that it is cationically polymerizable and, as such, the specific monomers mentioned hereinbefore can be employed.

The (b) monomer component not containing isobutylene group as a predominant monomer is preferably such that it is containing as a predominant monomer an aromatic vinyl monomer. In this case, the proportion of the aromatic vinyl monomer in the above monomer component is at least 60 weight %, preferably at least 80 weight %. The preferred species of said aromatic vinyl monomer is styrene, α-methylstyrene, p-methylstyrene, or indene. Those monomer components can be used each alone or in a combination of two or more species.

The alkenyl-group-containing silicon compound mentioned above is a silicon compound which contains one or more alkenyl groups and is capable of reacting with the active site of cationic polymerization. It is used for the purpose of introducing the alkenyl group into the copolymer.

The above alkenyl-group-containing silicon compound is preferably one represented by the following general formula

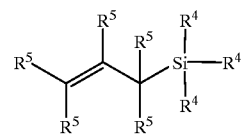
(3)

Referring to the alkenyl-group-containing silicon compound represented by general formula (3), the pluralities of $R^4$ and $R^5$ may respectively be the same or different and each represents hydrogen, halogen, or a substituted or unsubstituted monovalent organic group. The halogen mentioned above is not particularly restricted but may for example be chlorine, fluorine, bromine, or iodine. The substituted or unsubstituted monovalent organic group which can be used is not particularly restricted but may for example be a monovalent hydrocarbon group, an alkoxy group, a phenoxy group, a carboxyl group, or an ester residue.

The hydrocarbon group mentioned above includes straight-chain or branched alkyl and alkenyl groups each containing 1 to 20 carbon atoms, preferably 1 to 10 carbon atoms, more preferably 1 to 6 carbon atoms, alkoxy group, cycloalkyl group and phenyl group, and alkylaryl group containing 7 to 20 carbon atoms, preferably 7 to 14 carbon atoms, and more preferably 7 to 10 carbon atoms. Unless the advantage of the present invention is compromised, at least some of the hydrogen atoms in the hydrocarbon group may be substituted by suitable substituent groups.

The preferred species for $R^4$ and $R^5$ includes hydrogen, chlorine, methyl, allyl, phenyl, methoxy, and ethoxy group. Silicon compounds having those substituent groups are readily available and highly reactive. Therefore, the alkenyl-group-containing isobutylene group block copolymer can be produced easily by using them.

The specific examples of said alkenyl-group-containing silicon compound which can be used are allyldimethylsilane, allyltrimethylsilane, allyltriethylsilane, allyltripropylsilane, allyltriisopropylsilane, allyltributylsilane, allyltriphenylsilane, allyldimethoxysilane, allyltrimethoxysilane, allyltriethoxysilane, allyldichlorosilane, allylmethyldichlorosilane, allylphenyldichlorosilane, allyl (chloropropyl)dichlorosilane, allyltrichlorosilane, diallyldimethylsilane, diallyldiethylsilane, diallyldipropylsilane, diallyldibutylsilane, diallyldiphenylsilane, triallylmethylsilane, and tetrallylsilane, among others. Those silicon compounds can be used each alone or in a suitable combination of two or more species. Among those silicon compounds, allyltrimethylsilane, diallyldimethylsilane, triallylmethylsilane, and tetrallylsilane are preferred. The most preferred is allyltrimethylsilane.

Since, in the second aspect of the invention, the alkenyl group to be introduced is derived from said silicon compound, a variety of alkenyl groups can be introduced by using the silicon compound suited to the intended application. For example, when the introduced alkenyl group is expected to have high reactivity, a silicon compound containing the allyl function, for instance, which has high reactivity, can be preferably used.

The above-mentioned alkenyl-group-containing silicon compound can be added at any desired stage during the step of polymerizing (a) a monomer component containing isobutylene group as a predominant monomer or the step of polymerizing (b) a monomer component not containing isobutylene group as a predominant monomer. Thus, in the step of polymerizing (a) a monomer component containing isobutylene group as a predominant monomer, said addition may be made before addition of (a) a monomer component containing isobutylene group as a predominant monomer, concurrently with addition of the monomer component (a), after completion of addition of the monomer component (a), or after substantial completion of polymerization of the monomer component (a). In the step of polymerizing (b) a monomer component not containing isobutylene group as a predominant monomer, said addition may be made before addition of (b) a monomer component not containing isobutylene group as a predominant monomer, concurrently with addition of the monomer component (b), after completion of addition of the monomer component (b), or after substantial completion of polymerization of the monomer component (b). From the standpoint of physical properties of the product block copolymer and the polymerization procedure, it is preferred to perform said addition at the stage when the polymerization of the monomer component (a) or the monomer component (b) has substantially completed.

Where necessary, the above polymerization reaction can be conducted in the presence of a Lewis acid catalyst. The Lewis acid that can be used as the acid catalyst may be any compound that can be used for cationic polymerization, thus preferably including metal halides such as $TiCl_4$, $TiBr_4$, $BCl_3$, $BF_3$, $BF_3 \cdot OEt_2$, $SnCl_4$, $SbCl_5$, $SbF_5$, $WCl_6$, $TaCl_5$, $VCl_5$, $FeCl_3$, $ZnBr_2$, $AlCl_3$, $AlBr_3$, etc.; and organometal halides such as $Et_2AlCl$, $EtAlCl_2$, etc. In terms of catalyst activity and commercial availability, $TiCl_4$, $BCl_3$, or $SnCl_4$ is particularly preferred.

The Lewis acid mentioned above is generally used in a proportion of 0.1 to 100 molar equivalents, preferably 0.3 to 50 equivalents, with respect to said polymerization initiator.

The above polymerization can also be carried out in the presence of an electron donor component where necessary. The electron donor component can be selected from among known electron donors provided that its donor number is 15 to 60. The preferred electron donor component includes but is not limited to pyridines, amines, amides, sulfoxides, and metal compounds containing an oxygen atom directly bound to a metal atom.

Referring to the above electron donor component, compounds having donor numbers within the range of 15 to 60 can be used. The donor number is a parameter representing the strength of various compounds as electron donors. Thus, 2,6-di-t-butylpyridine, 2-t-butylpyridine, 2,4,6-trimethylpyridine, 2,6-dimethylpyridine, 2-methylpyridine, pyridine, diethylamine, trimethylamine, triethylamine, tributylamine, N,N-dimethylaniline, N,N-dimethylformamide, N,N-dimethylacetamide, N,N-diethylacetamide, dimethyl sulfoxide, diethyl ether, methyl acetate, ethyl acetate, trimethyl phosphate, hexamethylphosphoric triamide, titanium alkoxides such as titanium(III) methoxide, titanium(IV) methoxide, titanium(IV) isopropoxide, titanium(IV) butoxide, etc.; and aluminum alkoxides such as aluminum triethoxide, aluminum tributoxide, etc. can be generally employed. Preferred are 2,6-di-t-butylpyridine, 2,6-dimethylpyridine, 2-methylpyridine, pyridine, diethylamine, trimethylamine, triethylamine, N,N-dimethylformamide, N,N-dimethylacetamide, dimethyl sulfoxide, titanium(IV) isopropoxide, and titanium(IV) butoxide.

For information on the donor numbers (DN values) of the above and other various substances, reference can be made to Gutmann: Donor and Acceptor (translated by Ohtaki and Okada, Gakkai Shuppan Center, 1983). Among those substances, 2-methylpyridine which provides a marked effect of addition and titanium(IV) isopropoxide which insures a homogeneous reaction system are particularly preferred.

The electron donor component is used in a proportion of generally 0.01 to 10 molar equivalents, preferably 0.2 to 4 molar equivalents, relative to the polymerization initiator.

The above polymerization reaction can be carried out in a solvent where necessary. The solvent may be any of the known solvents provided that it does not essentially interfere with cationic polymerization. Thus, the solvent includes but is not limited to halogenated hydrocarbons such as methyl chloride, dichloromethane, n-propyl chloride, n-butyl chloride, chlorobenzene, etc.; benzene and alkylbenzenes such as toluene, xylene, ethylbenzene, propylbenzene, butylbenzene, etc.; straight-chain aliphatic hydrocarbons such as ethane, propane, butane, pentane, hexane, heptane, octane, nonane, decane, etc.; branched-chain aliphatic hydrocarbons such as 2-methylpropane, 2-methylbutane, 2,3,3-trimethylpentane, 2,2,5-trimethylhexane, etc.; alicyclic hydrocarbons such as cyclohexane, methylcyclohexane, ethylcyclohexane, etc.; and paraffin oil available on hydrogenation and purification of a petroleum fraction. Those solvents can be used each alone or in a combination of two or more species taking into consideration of the balance between the polymerization characteristics of the constituent monomers for the block copolymer and the solubility of the product copolymer.

The amount of the solvent is generally selected in such a manner that the polymer concentration will be 1 to 50 weight %, preferably 5 to 35 weight %, in consideration of the viscosity of the obtained polymer and the ease of heat removal.

In conducting the above polymerization reaction, the above-mentioned component materials are preferably mixed under cooling, for example at a temperature between $-100°$ C. and $0°$ C. To strike a balance between energy cost and polymerization stability, the temperature range of $-80°$ C. through $-30°$ C. is particularly recommended.

In the production of said alkenyl-group-containing isobutylene group block copolymer, there is no particular limitation on the way and order of addition of said Lewis acid, polymerization initiator, electron donor component, and monomer components. A preferred procedure may for example comprise (A) a step of polymerizing (a) a monomer component containing isobutylene group as a predominant monomer in the presence of said polymerization initiator-Lewis acid initiation system and said electron donor component, (B) a step of adding (b) a monomer component not containing isobutylene group as a predominant monomer to polymerize, and (C) a step of adding said alkenyl-group-containing silicon compound for introduction of alkenyl function at a stage where the polymerization has substantially completed. Referring to the above procedure, addition of said monomer component (b) is generally carried out when the polymerization of said monomer component (a) has substantially completed in step (A). However, when a monomer component less active than isobutylene group for cationic polymerization is used for said monomer component (b), the objective block copolymer can still be produced even if said monomer component (b) is added prior to substantial completion of the polymerization of said monomer component (a) instep (A). Moreover, when a comonomer component, which is substantially equivalent to isobutylene group in cationic polymerization activity and which is concurrently copolymerizable, is used for said monomer component (b), a block copolymer which has partly randomized polymer block can be produced by adding (b) a monomer component not containing isobutylene group as a predominant monomer prior to substantial completion of the polymerization of (a) a monomer component containing isobutylene group as a predominant monomer in step (A).

The proportions of said respective components can be judiciously selected according to the characteristics required of the product block copolymer. The proportions of said monomer component (a) and said monomer component (b) are preferably selected in such a manner that isobutylene group accounts for 95 to 20 weight % and said aromatic vinyl monomer component accounts for 5 to 80 weight % based on the total amount of monomer units constituting the product block copolymer. More preferably, isobutylene group accounts for 85 to 60 weight % and said aromatic vinyl monomer accounts for 15 to 40 weight %. When isobutylene group alone is used for said monomer component (a) and said aromatic vinyl monomer alone for said monomer component (b), the proportion of the monomer component (a) can be set at 95 to 20 weight % and that of the monomer component (b) in a complementary amount of 5 to 80 weight %. The molecular weight of the product block copolymer can be controlled by adjusting the molar relationship of said monomer component (a), said monomer component (b) and polymerization initiator of general formula (2). Usually, the above-relationship is selected so that the number average molecular weight of the product block copolymer will be about 20000 to 500000.

The third aspect of the present invention is concerned with an alkenyl-group-containing isobutylene group block copolymer produced by the above production process of the second aspect of the invention.

The alkenyl-group-containing isobutylene group block copolymer is not particularly restricted provided that it contains a polymer block derived from (a) a monomer component containing isobutylene group as a predominant monomer and a polymer block derived from (b) a monomer component not containing isobutylene group as a predominant monomer. Thus, for example, linear, branched linear, and star block copolymer structures or diblock, triblock, and multiblock copolymer structures, among others, can be freely selected.

The alkenyl-group-containing isobutylene group block copolymer of the present invention can be used in applications similar to the conventional isobutylene group block copolymers. For example, it can be used as an elastomer material, a resin or asphalt modifying agent, or a resin compound component, among others.

The melt viscosity of the alkenyl-group-containing isobutylene group block copolymer of the invention can be freely controlled by adding various crosslinking agents. Therefore, when the alkenyl-group-containing isobutylene group block copolymer of the invention is to be blended with other resin, their compatibility can be improved by aligning the melt viscosities of the two components.

Moreover, by reacting the alkenyl-group-containing isobutylene group block copolymer of the invention with a suitable reagent, the alkenyl group can be converted to a different functional group. The functional group available upon conversion may for example be epoxy, carboxy, hydroxy, amino, or cyano group. By selecting the proper functional group, the compatibility of the isobutylene group block copolymer with other resins, reactivity, polarity, and other characteristics can be controlled as desired.

The forth aspect of the present invention is concerned with a reactive-silicon-group-containing isobutylene group block copolymer comprising a polymer block derived from (a) a monomer component containing isobutylene group as a predominant monomer and a polymer block derived from (b) a monomer component not containing isobutylene group as a predominant monomer, and said copolymer containing a reactive silicon group of general formula (4);

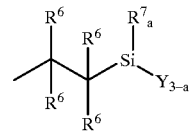

(4)

wherein a plurality of $R^6$ may be the same or different and each represents hydrogen atom, halogen atom, or a substituted or unsubstituted monovalent organic group; $R^7$ represents a monovalent organic group of 1 to 5 carbon atoms, and when two of $R^7$ are contained, these may be the same or different; Y represents a halogen atom or alkoxy group, and with providing that more than two of Y are contained, these may be the same or different; and a represents an integer of 0 to 2. The halogen atom, a substituted or unsubstituted monovalent organic group, and alkoxy group are not restricted but include, for example, the above mentioned compounds. The monovalent organic group of 1 to 5 carbon atoms is not restricted but includes, for example, hydrocarbon groups such as methyl, ethyl, n-propyl, isopropyl, or butyl.

The above reactive-silicon-group-containing isobutylene group block copolymer can be advantageously used for various applications, for example, as an elastomer material, a resin or asphalt modifying agent, or a resin compound component among others.

The fifth aspect of the present invention relates to a process for producing a reactive-silicon-group-containing isobutylene group block copolymer which comprises subjecting the compound represented by the general formula (5) to hydrosilylation reaction with an alkenyl group of an alkenyl-group-containing isobutylene group block copolymer comprising a polymer block derived from (a) a monomer component containing isobutylene group as a predominant monomer and a polymer block derived from (b) a monomer component not containing isobutylene group as a predominant monomer.

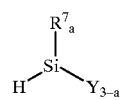

(5)

wherein $R^7$ represents a monovalent organic group of 1 to 5 carbon atoms, and when two of $R^7$ are contained, these may be the same or different; Y represents a halogen atom or alkoxy group, with providing that more than two of Y are contained, these may be the same or different, and a represents an integer of 0 to 2. The halogen atom, substituted or unsubstituted monovalent organic group is not particularly restricted but may for example be the above mentioned examples.

Because of the high activity of the alkenyl, said alkenyl-group-containing isobutylene group block copolymer is preferably alkenyl-group-containing isobutylene group block copolymer of the first aspect of the present invention.

Moreover, it is preferable to produce said alkenyl-group-containing isobutylene group block copolymer by the process of the second aspect of the present invention.

As a compound represented by the general formula (5), for example, trichlorosilane, methyldichlorosilane, dimethylchlorosilane, trimethoxysilane, dimethoxymethylsilane, dimethylethoxysilane, diethoxymethylsilane are mentioned. These compounds may be used alone, or in combination.

In the hydrosilylation reaction, a transition metal catalyst is generally used as a catalyst for hydrosilylation reaction. The transition metal catalyst which can be used is not particularly restricted but includes, for example, compounds in which a platinum is dispersed into carrier such as alumina, silica, carbonblack etc.; platinic chloride; complex of platinic chloride with alcohol, aldehyde, or ketone etc.; platinum-olefin complex; platinum(0)-divinyltetramethyldisiloxane complex; compounds other than platinum compounds such as $RhCl(PPh_3)_3$, $RhCl_3$, $RuCl_3$, $IrCl_3$, $FeCl_3$, $AlCl_3$, $PdCl_2.H_2O$, $NiCl_2$, or $TiCl_4$. These may be used alone or in combination.

In view of the efficiency of the hydrosilylation reaction, it is preferable that the hydrosilylation reaction is carried out using a platinum complex as a catalyst at the temperature of 40° C. or higher.

EXAMPLES

The following examples are intended to illustrate the present invention in further detail and should by no means be construed as defining the scope of the invention.

Example 1

The polymerization vessel of a 500 mL separable flask, after nitrogen purging, was charged with 120 mL of n-hexane (dehydrated with molecular sieves), 80 mL of methylene chloride (dehydrated with molecular sieves) using a syringe, and 0.0876 g (0.38 mmol) of p-dicumyl chloride. The polymerization vessel was cooled in a dry ice/methanol bath at −70° C. and 0.036 g (0.39 mmol) of 2-methylpyridine was added. Then, a Teflon delivery tube was connected to a pressure-resistant glass liquefaction tube equipped with a 3-way cock and containing 33.9 mL (419.9 mmol) of isobutylene monomer component, and isobutylene group monomer component was fed under nitrogen pressure to the polymerization vessel. Then, 1.50 mL (13.7 mmol) of titanium tetrachloride was added for initiation of polymerization. After 1 hour of stirring at the same temperature after beginning of polymerization, about 1 mL of the polymer slurry was withdrawn for sampling purposes. Then, a mixture of 12.15 g (116.7 mmol) of styrene monomer component, 12 mL of n-hexane, and 8 mL of methylene chloride, cooled to −70° C. beforehand, was added to the polymerization vessel. After 10 minutes said addition of the above mixture, 0.134 g (1.17 mmol) of allyltrimethylsilane was added and the mixture was stirred at the prevailing temperature for 60 minutes. The reaction was then stopped by adding about 10 mL of methanol. From this reaction mixture, the solvent etc. were distilled off and the residue was dissolved in toluene and washed with 2 portions of water. To the toluene solution was added to a large amount of methanol to precipitate the polymer, which was dried in vacuo at 60° C. for 24 hours to provide the objective block copolymer.

GPC analysis of the product block copolymer (instrument: Waters Model 510 GPC System, mobile phase: chloroform, polymer concentration: 2 mg/ml, column temperature 35° C., standard: polystyrene) revealed that whereas the number average molecular weight (Mn) and molecular weight distribution (Mw/Mn) of isobutylene group copolymer prior to addition of styrene were 70000 and 1.16, respectively, the number average molecular weight (Mn) and molecular weight distribution (Mw/Mn) of the block copolymer after polymerization of styrene were 101000 and 1.23, respectively.

The integrated intensity ratio of isobutylene group and that of allyl on the $^1$H-NMR spectrum (instrument: Varian Gemini-300, measuring solvent: $CDCH_3$) of the resulting block copolymer suggested that an average number of 1.9 allyl groups had been introduced per polymer molecule.

Example 2

Except that the amount of p-dicumyl chloride was set at 0.35 g (1.52 mmol) and that of 2-methylpyridine at 0.072 g (0.78 mmol), the procedure of Example 1 was otherwise repeated.

GPC analysis of the resulting block copolymer showed that, whereas the number average molecular weight and molecular weight distribution of isobutylene group polymer before addition of styrene were Mn=18000 and Mw/Mn=1.22, respectively, the corresponding values of the block copolymer after polymerization of styrene were Mn=26000 and Mw/Mn=1.38, respectively.

The integrated intensity ratio of isobutylene group and that of allyl on the $^1$H-NMR spectrum of the resulting block copolymer suggested that an average of 1.7 allyl groups had been introduced per polymer molecule.

Example 3

A 200 mL four-necked flask equipped with a condenser was charged with 10.0 g of the block copolymer obtained in Example 2, 50 mL of toluene, $1.8 \times 10^{-3}$ mmol of platinum divinyltetramethyldisiloxane complex (dissolved in xylene), and 0.85 g (0.8 mmol) of dimethoxymethylsilane, and the charge was stirred at 80° C. for 10 hours to undergo hydrosilylation of the block copolymer. The reaction mixture was then poured in 200 mL of methanol to provide a reactive-silicon-group-containing isobutylene group block copolymer.

The integrated intensity ratio of isobutylene group and that of methyl of the silicon on the $^1$H-NMR spectrum of the above polymer suggested that an average of 1.3 dimethoxymethylsilyl groups had been introduced per polymer molecule.

Comparative Example 1

Except that an isopropenyl-terminated block copolymer available upon heat treatment of a chlorine-terminated styrene-isobutylene group-styrene copolymer was used in lieu of the block copolymer obtained in Example 1, the reaction procedure of Example 3 was otherwise repeated to provide a polymer.

The ¹H-NMR spectrum of this polymer showed no peak of dimethoxymethylsilyl group.

It can be understood from the foregoing examples that the rate of alkenyl introduction into the block copolymer according to the process for the invention is high and that the alkenyl group in the block copolymer of the invention is highly reactive and can be easily converted to dimethoxymethylsilyl group.

Effect of the Invention

Having the constitution described hereinabove, the present invention enables synthesis of an isobutylene group block copolymer containing a highly reactive alkenyl group with a high introduction rate of an alkenyl group in an expedient manner. Further, the present invention enables synthesis of a reactive-silicon-group-containing block copolymer in an expedient manner.

What is claimed is:

1. An alkenyl-group-containing isobutylene group block copolymer comprising a polymer block derived from (a) a monomer component containing isobutylene group as a predominant monomer and a polymer block derived from (b) a monomer component not containing isobutylene group as a predominant monomer, said copolymer containing an alkenyl group of the following general formula (1);

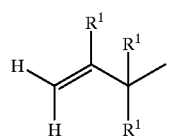
(1)

wherein the plurality of $R^1$ may be the same or different and each represents hydrogen, halogen, or a substituted or unsubstituted monovalent organic group.

2. The alkenyl-group-containing isobutylene group block copolymer according to claim 1 wherein said polymer block derived from (b) monomers component not containing isobutylene group as a predominant monomer contains said alkenyl group of general formula (1).

3. The alkenyl-group-containing isobutylene group block copolymer according to claim 1 wherein said copolymer has at least one terminal alkenyl group.

4. The alkenyl-group-containing isobutylene group block copolymer according to claim 1, wherein the alkenyl group is allyl.

5. The alkenyl-group-containing isobutylene group block copolymer according to claim 1, wherein said polymer block derived from (b) a monomer component not containing isobutylene group as a predominant monomer is a polymer block derived from a monomer component containing as a predominant monomer an aromatic vinyl monomer.

6. The alkenyl-group-containing isobutylene group block copolymer according to claim 5 which is a triblock copolymer comprising a polymer block derived from a monomer component containing as a predominant monomer an aromatic vinyl monomer component—a polymer block derived from (a) a monomer component containing isobutylene group as a predominant monomer—a polymer block derived from a monomer component containing as a predominant monomer an aromatic vinyl monomer component.

7. The alkenyl-group-containing isobutylene group block copolymer according to claim 2 wherein said copolymer has at least one terminal alkenyl group.

* * * * *